United States Patent [19]

Nesch et al.

[11] Patent Number: 4,734,023

[45] Date of Patent: Mar. 29, 1988

[54] INJECTION MOLDING MACHINE

[75] Inventors: Wolfgang Nesch, Lahr-Sulz; Kurt Schmidts, Schwanau, both of Fed. Rep. of Germany

[73] Assignees: Klöckner Ferromatik Desma GmbH, Malterdingen; BASF Aktiengesellschaft, Ludwigshafen, both of Fed. Rep. of Germany

[21] Appl. No.: 62,085

[22] Filed: Jun. 15, 1987

[30] Foreign Application Priority Data

Jun. 14, 1986 [DE] Fed. Rep. of Germany ....... 3620175

[51] Int. Cl.$^4$ .................................. B29C 45/16
[52] U.S. Cl. .................... 425/130; 264/255; 264/297.3; 264/513; 264/538; 425/134; 425/572; 425/581; 425/589
[58] Field of Search .......... 264/255, 297.3, 513, 264/538, 328.8; 425/130, 131.1, 134, 572, 581, 588, 589, 595, 542, 129 S

[56] References Cited

U.S. PATENT DOCUMENTS

| 4,123,493 | 10/1978 | Schilke et al. | 425/130 |
| 4,243,362 | 1/1981 | Rees et al. | 425/130 |
| 4,330,257 | 5/1982 | Rees et al. | 425/572 |

FOREIGN PATENT DOCUMENTS 1215353 4/1966 Fed. Rep. of Germany.

Primary Examiner—Jay H. Woo
Assistant Examiner—Timothy W. Heitbrink
Attorney, Agent, or Firm—Watson, Cole, Grindle & Watson

[57] ABSTRACT

An injection molding machine for use with at least two melting and injector units includes a fixed die platen, a movable die platen, and fixed spars on which said movable die platen moved. The die platens mount half-mold parts of injection molds while the other half-mold parts are positioned on a prismatic support base which can be rotated around its axis between these half-mold parts and which is movable in the direction of the fixed spars. The movable die platen mounts movable spars along which the prismatic support base is guided in the area between the two die platens. On the rear face of the movable die platen which faces away from the support base is positioned at least one drive for the two movable spars, and the movable die platen includes at least one runner for plasticized material injected therein from a melting and injector unit.

5 Claims, 6 Drawing Figures

INJECTION MOLDING MACHINE

BACKGROUND OF THE INVENTION

1. Field of the Invention

This invention relates to an injection molding machine of the type which operates with at least two melting and injector units, the injection molding machine including a movable die platen that mounts a half part of an injection mold and is movable on fixed spars, a fixed die platen that mounts a half part of an injection mold, and a prismatic support base which can be pivoted around its axis between these half-mold parts on the movable die platen and the fixed die platen and which is movable in parallel with the elongation dimension of the fixed spars, the side surfaces of the support base which extend in parallel with its axis including the complementary half parts of the injection molds to the half parts on the movable die platen and the fixed die platen.

2. The Prior Art

Injection molding machines which operate with two melting and injector units and which include a prismatic support base are known—see German Auslegeschrift No. 12 15 353.

To inject plasticized material, the half-mold parts on the two die platens (which always face one another) and those on the prismatic support base are brought together to create closed (complete) injection molds, one of the injection molds having a broken mold core that has been extruded in the previous injection molding cycle and the other injection mold being empty. After injecting melted material, which occurs simultaneously from the two melting and injector units, one of the injection molds will have a finished jet molded part while the other injection mold will contain a broken mold core. The injection molds are then opened by appropriately moving the movable die platen along the fixed spars. Since tension springs are located between the die platens and the guides for the prismatic support base on the spars, the injection molds open automatically when the movable die platen is appropriately moved. When the injection molds open, the prismatic support base can be pivoted in such a way that the broken mold core together with its half-mold part assumes the position of the half-mold part with the broken mold core from the previous injection cycle. Subsequently, an appropriate shift of the movable die platen, while the injection mold is being created, will cause the half-mold parts located opposite one another to be in a closed position while material is again injected, so that a finished injection molded object and a broken mold core are again extruded simultaneously.

By processing different types of plastic materials with the two melting and injector units, molded objects can be produced which differ, for instance, with regard to material characteristics and color.

One of the melting and injector units, together with the movable die platen, forms a movable component which is guided along the spars, while the other melting and injector unit works in conjunction with the fixed die platen.

To open and close the injection molds formed by the respective half-mold parts, a toggle lever serves as closing unit, the toggle lever being controlled by the movable melting and injector unit and by the frame of the machine and can also be acted upon by a working hydraulic cylinder.

The axis of the prismatic support base is positioned in such a way that it can be rotated within two bearing sleeves which are positioned on the fixed spars in such a way that they can be moved. Between these two spars and the die platen are the tension springs.

The prismatic support base, when viewed in cross section transverse to its axis, exhibits the outline of a regular octagon, whereby its side surfaces, which extend in parallel with its axis, support half-mold parts and its axis is horizontal and perpendicular to the direction of its movement, i.e., perpendicular to the elongation direction of the spars.

However, these injection molding machines have significant disadvantages. For example, the mass moved on the spars is too great. In this regard, it is in general desirable in such injection molding machines to keep the kinetic energy of the mass to be moved on the spars as low as possible since the total mass in one end position, i.e., the maximum opening of the injector machines, should be accelerated as rapidly as possible from the resting position to a preset maximum speed, which is then held constant until it reaches the mold closing control point. From this point on the entire mass is decelerated in such a way that the mold forms are closed while moving at a crawl. It seems obvious that when injection cycles are as brief as possible and distances over which the total mass is accelerated from the rest position to maximum speed are as short as possible and the remaining distance from the mold-closing control point to the closing of the mold is as short as possible, the mass to be accelerated should also be as small as possible.

However, reducing the total mass that must be moved in such injection molding machines is not by itself sufficient since the support base together with its collet and tension springs between the die platens forms a muffled system that can oscillate in the course of its dynamic movements, and since its half-mold parts bounce against the mold parts of the die platens as soon as the available time is too short for the injection cycles, so that the injection cycles of these injection machines is too long in comparison to the injection cycle of modern machines in which only the half-mold parts of injection molds are placed between their die platens. This is apparently one of the reasons why such injection molding machines with an additional prismatic support base between the die platens have not been accepted.

Against the background of these considerations, the present invention addresses the problem of designing this type of an injection molding machine in such a way that the closing of the injection molds is assured while moving at a crawl, and in such a way that the injection cycles are kept as short as possible.

The invention furthermore addresses the problem of designing such injection molding machines in such a way that molded articles can be created in which more than two sections are made of plastic materials with different properties and/or different colors or shades of color, or in which areas alternate between being transparent and opaque.

SUMMARY OF THE INVENTION

According to the invention movable spars are provided that are guided by the movable die platen; the prismatic support base in the area between the two die platens is mounted on the movable spars in such a way that it can rotate; the rear face of the movable die platen which faces away from the support base has at least one drive for the two movable spars; the movable die platen has at least one sprue channel or runner which leads to a side surface which is parallel to the movement direction of the runner; and that the runner can be engaged by one of the melting and injector units. By these means it becomes possible for the movable die platen to assume the role of a fixed die platen for the prismatic support base wherein the mounted mold parts on the fixed die platen work together with the half-mold parts on the support base, which in a way has the function of a movable die platen. Because of this arrangement it becomes possible to control the course of the movement of the support base precisely and in such a way that the injection molds, which will invariably be formed as a function of the position of the support base, will always be closed while moving at a crawl, whereby it is totally immaterial whether the mold parts which are mounted on the support base are of the same or of different heights. To make sure that the formed injection molds are always closed while moving at a crawl, it is necessary to exercise corresponding control over the motion of the movable spars. It is possible in principle to provide a drive for each of the movable spars on the rear face of the movable die platen which faces away from the support base, i.e., a correspondingly controlled pulse motor, which is programmed to consider the form height of the mold parts mounted on the support base, in which case one always has to start, of course, with the starting position of the support base, and wherein the respective angle of rotation of the support base indicates which mounted half-mold part relates to the mold part of the movable die platen on the opposite side. A corresponding arrangement is true, of course, for the adjustment of the mounted half-mold parts on the prismatic support base to the half-mold parts mounted on the fixed die platen. Instead of having one drive unit for each spar, a single drive unit may be used for both movable spars in such a way that the movable spars are connected by a tie-bar on the side of the movable die platen which is opposite the prismatic support base and that the drive unit, which may also be a hydraulic or pneumatic working cylinder, is placed between the tie-bar and the rear face of the movable die platen which faces away from the support base. After the closing of the injection mold, which is formed by the half-mold part mounted on the movable die platen and the half-mold part on the support base, movement occurs with a closing unit whereby the movable closing unit, formed by the movable die platen and the support base, moves in the direction of the fixed die platen, and whereby the rest of the movement just before the closed state of the injection mold that is defined by the half-mold part mounted on the opposite side of the prismatic base and the half-mold part mounted on the fixed die platen is reached occurs at a crawl in a manner that, as such, is not new. Because of the fact that, contrary to the prior art, no melting and injector unit is located on the half-mold part mounted on the movable die platen which would require the unit also to move with the movable die platen, the entire mass that has to be moved is greatly reduced and is of the same size as that of previously known injection molding machines which only have injection molds between their die platens.

After the injection molds are closed, the melting and injector unit attached to the movable die platen makes contact with the runner, whereby and contrary to the prior art, the design of the melting and injector unit is such that it makes contact with the runner in the closed position of the injection mold. The runner, also contrary to the prior art, is arranged in such a way that it ends at a side surface which extends in Parallel with the direction of the motion of the movable die platen. The melting and injector unit, in accordance with the invention, is also arranged to be movable transversely to the moving direction of the movable die platen.

The movable die platen of the invention has at least one runner which is designed in accordance with the invention. In principle the die platen may contain three such runners which, always separate from one another, have a section which forms an angle in the moving direction of the movable die platen and which end in the mold cavity in a manner previously known, but in the present case independent of one another, so that it is possible, for instance, to extrude plasticized material on three sides of the broken mold core when producing the finished molded object.

The prismatic support base, in the simplest case, has a square configuration when viewed transversely to its axis, but it can also have an outline of irregular N-shaped corners. It is only necessary to meet the condition that the opposite side surfaces of the prismatic base are parallel and that, in the closed position of the injection molds, they are parallel to the die platens.

The prismatic base, in another design of the invention, has the configuration of at least a rectangle, and the movable spars are aligned in a vertical plane and can make contact in the closed position of the half-mold parts mounted on the die platens with the corresponding half-mold parts of the prismatic base, and the half-mold parts located on additional die platens can make contact with other half-mold parts of the prismatic base and with other melting and injector units to inject the plasticized material. In this way it also becomes possible for other melting and injector units to make contact with other corresponding die platens and half-mold parts so that, for instance, the number of finished objects in one injection cycle can be increased considerably. It also becomes possible to inject, in one injection cycle, other plasticized plastic materials with other properties into the mold so that at the end of one injection cycle the produced object, which was molded on several injection phases, exhibits a correspondingly large number of different areas of different materials or has sections with different material properties.

In yet another design of the invention, the drive for the movable spars is the working cylinder for the ejector, wherein the working cylinder is located on the rear face of the movable die platen that faces away from the prismatic base and within one of the tie-bars that connects the movable spars.

In another embodiment of the invention, the fixed platen and the movable die platen on the faces facing each other always include one toothed rod, wherein a pinion gear is positioned between the two toothed rods and the pinion interacts with the rods and wherein the axle of the pinion gear is positioned with the movable spars of the support base in such a way that they move together and the transmission ratio of the toothed rods and the pinion gear is chosen so that the distance of the open mold parts of the movable die platen and of the prismatic support base is equivalent to half the distance covered by the movable die platen on the spars between the two end positions. By this arrangement it becomes possible that in the end position of the movable die platen which corresponds to the maximum distance between the mold parts of the open molds, the support base is located in the center between the movable and the fixed die platen.

The invention will be further understood by reference to the attached drawings, taken in conjunction with the following discussion.

DETAILED DESCRIPTION OF THE PREFERRED EMBODIMENTS

Figure 1:
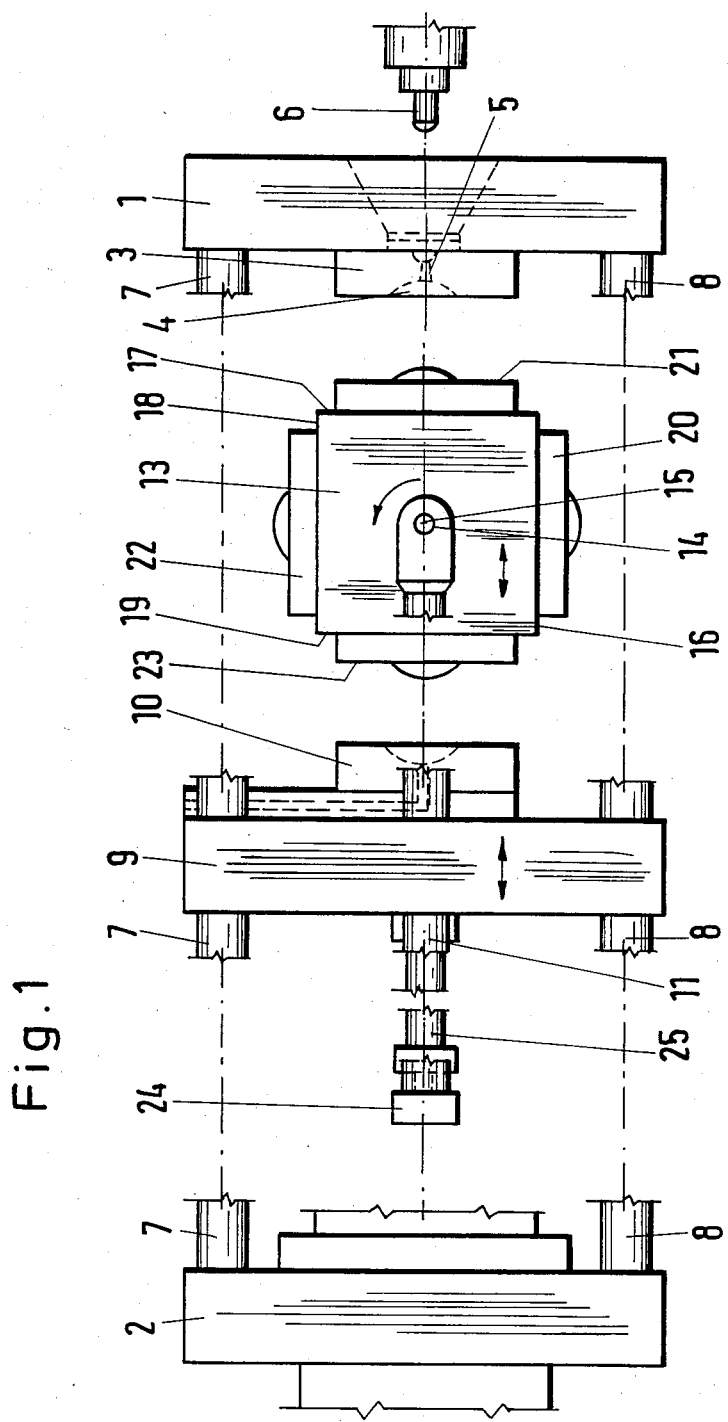
FIG. 1 shows a side view, partially broken away, of a first preferred embodiment of an injection molding machine constructed according to the present invention.
Figure 2:
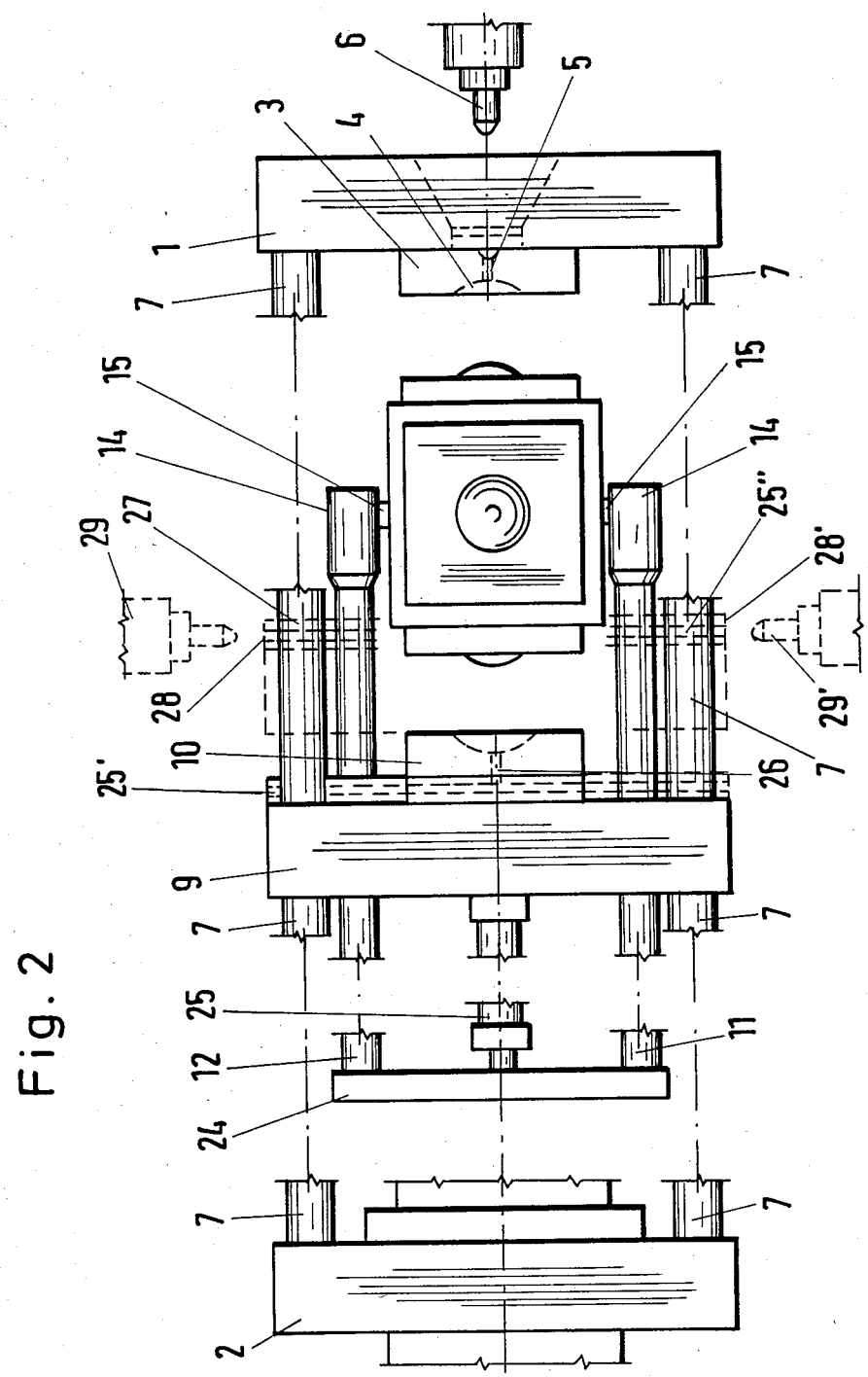
FIG. 2 shows a top view of the injection molding machine shown in FIG. 1.

Referring to FIGS. 1 and 2, which show a first preferred embodiment of an injection molding machine according to the present invention, it is seen to include two fixed platens 1 and 2 that are positioned on a machine frame (not shown). Fixed die Platen 1 mounts a half-mold part 3 which, in a known manner, contains a mold cavity 4. The fixed die platen 1 furthermore has an extrusion bore 5 therein through which, in a known way, a plasticized plastic material is injected from a melting and injector unit 6. Platens 1 and 2 form, together with an upper pair of spars 7 and a lower pair of fixed spars 8, a guide for a movable die platen 9 which, on the front face 9a that faces the fixed die platen 1, mounts a half-mold part 10. Only one spar of each of the two pairs 7,8 is visible in FIG. 1. The movable die platen 9 also mounts two movable spars 11 and 12, which at all times extend through the movable die platen 9 from a first end spaced away from the rear face 9b thereof to a second end spaced away from the front face 9a.

In the area between the two die platens, i.e., in the area between half-mold parts 3 and 10, a core-carrying support base 13 is positioned so that it can be rotated between bearings 14 at the second ends of the movable spars 11, 12. A cross section through the support base traverse to the axis 15 shows a profile of a prismatic object, in this case a regular rectangle.

On the side surfaces 16, 17, 18 and 19 of the support base, half-mold parts are mounted which are designated as 20, 21, 22 or 23, respectively.

On the face of the movable die platen that faces away from the core-carrying support base, the ends of the two movable spars 11, 12 are connected by a tie-bar 24 (see FIG. 2). Between this tie-bar and the movable die platen a double-acting working cylinder, e.g., a pneumatic or hydraulic working cylinder 25, is positioned, the operation of which causes the relative movements of the movable spars together with the support base with regard to the movable die platen 9.

FIG. 2, which is a top view of the injection molding machine shown in FIG. 1, shows the paired arrangement of fixed spars 7 (spar pair 8 is not visible), and it also shows movable spars 11 and 12. The closing unit for the machine is not shown in FIGS. 1 and 2 for the sake of clarity. However, in the simplest design the closing unit is a knee joint which, through a known cylinder that acts in two directions, moves the movable die platen out of one end position, i.e, the position of maximum distance between the die platens, to the other end position, i.e., the minimum distance between the two die platens. This simultaneously creates a closed injection (complete) mold out of two half-mold parts which face each other. A known closing unit with drive cylinders and form-closing cylinders, which would also move the movable die platen during one injection cycle between these two positions, could also be used.

The dashed line in FIG. 2 shows the position of the movable die platen 9 in its second end position. Also shown by dashed lines is the runner through which the plasticized material is injected by a second melting and injector unit 29 into the mold cavity of the injection mold, i.e., after the two mold parts 23 and 10, which define the mold, have closed. This runner consists of a section 27, which extends transversely to the elongation direction of the spars and leads to side face 28, which extends parallel with the elongation direction of the spars.

The second melting and injector unit 29 is guided so as to move transversely to fixed spars 7, 8 and also transversely to spars 11 and 12. As soon as the movable die platen has reached its second end position, the second melting and injector unit 29, which is located outside the area of the movable die platen, is moved in a direction that is transverse to the elongation direction of the spars until it engages the extrusion runner that extends to face 28.

From FIG. 1 it is apparent that below spars 8 a continuous conveyor 30 extends loop in a horizontal plane in the area of fixed die platen 1 which removes the finished molded object.

The movable die platen 9 may, instead of having only one extrusion bore 26, 27, have a second extrusion bore 26', 27' which ends at side face 28' opposite side face 28 and for which a second melting and injector unit 29' is provided.

In FIG. 1 and FIG. 2 the injection molding machine is shown in an intermediate position between the two end positions. The distance of the support base 13 to the movable die platen 9 is large enough so that it can be pivoted around its axis, which is 90° in the present case. After such a rotation, half-mold part 10 on movable die platen 9 and half-mold part 23 on the support base face each other and half-mold part 21 of the support base and half-mold part 3 of fixed die platen 1 also face each other.

An injection cycle is initiated in such a way that movable spars 11 and 12, through the corresponding action of working cylinder 25, propel the core-carrying support base in the direction of movable die platen 9; shortly before the injection mold formed by the two half-mold parts 10 and 23 closes, the speed is reduced in such a way that the mold closes while moving at a crawl. Subsequently, by action of the drive cylinder of the closing unit (not shown), the unit which is formed by the movable die platen and the support base, as well as the movable spars, is moved in the direction of fixed die platen 1, whereby the speed of this unit is also reduced shortly before the mold closes so that the injection mold to be formed by the half-mold parts 21 and 3 also closes while moving at a crawl.

Subsequently the melting and injector unit 29 is moved in the direction of spars 7, 8 or respectively, 11 and 12, in such a way that it engages runner 27 which opens on face 28. Subsequently the melting and injector unit 29 injects a corresponding amount of plasticized material into the mold formed by half-mold parts 10 and 23 while melting and injector unit 6 also injects plasticized material into the mold formed by half-mold parts 3 and 21, whereby a broken mold is formed within the mold formed by mold parts 3 and 21 and a finished object in the mold formed by mold parts 10 and 23.

Subsequently the movable die platen on fixed spars 7 and 8 is moved in such a way, and the movable spars 11 and 12 are moved in such a way, that half-mold parts 10 and 23, as well as 21 and 3, are no longer in contact and support base 13 is rotated by 90° counterclockwise so that half-mold parts 11 and 22 as well as 20 and 3 face each other. Subsequently the movable die platen and the movable spars are moved in such a way that the mold formed by half-mold parts 10 and 22, as well as 20 and 3, close and that a broken mold and a finished object can be simultaneously injection molded in the manner described.

With each rotation phase one of the half-mold parts positioned on the support base occupies the position shown for mold part 20 in FIG. 1, whereby one of the half-mold parts located in this position ejects the finished molded object from the form. This is accomplished in a familiar way by means of an ejector. The ejector may be positioned in the support base, so that it then drops onto endless conveyor belt 30 which moves in a horizontal plane below spars 8; the ejector can, however, also be integrated with movable die platen 9 and then eject the finished molded object from half-mold part 10. The conveyor belt, in the latter case, is correspondingly positioned more in the direction of fixed platen 2.

Figure 3:
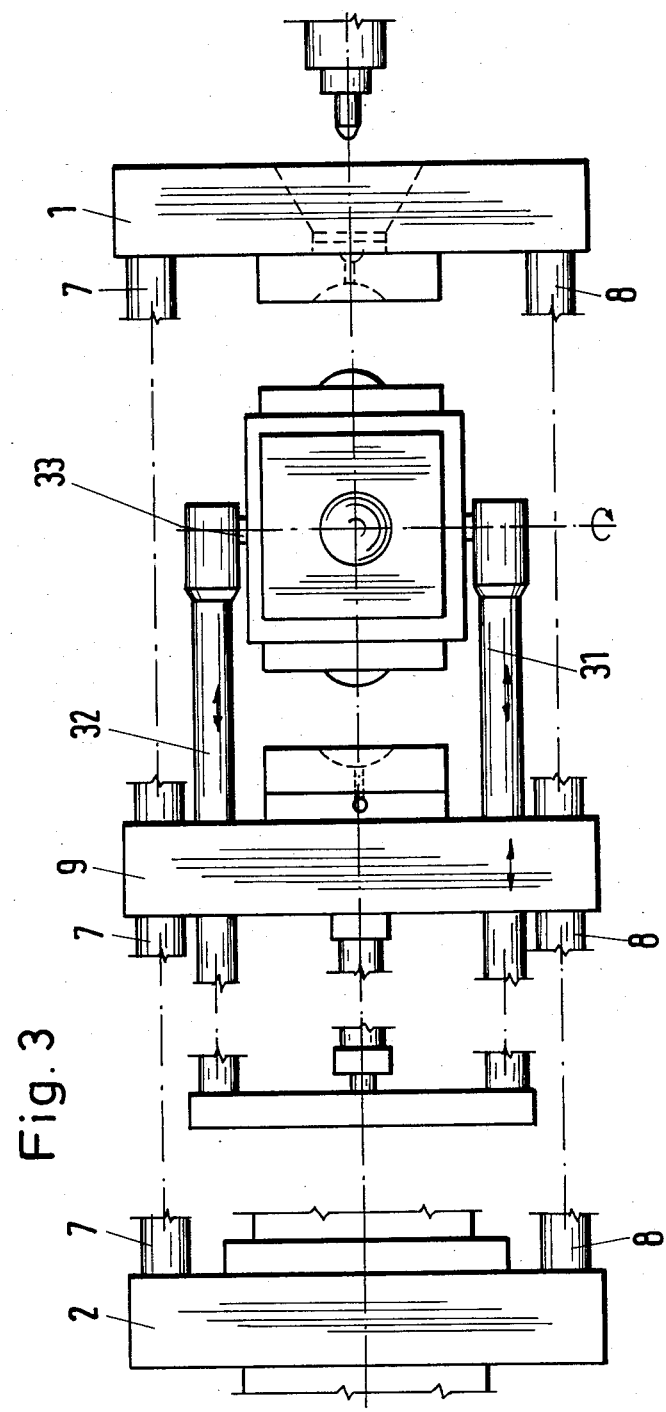
FIG. 3 shows a side view, partially broken away, of a second preferred embodiment of an injection molding machine according to the present invention.
Figure 4:
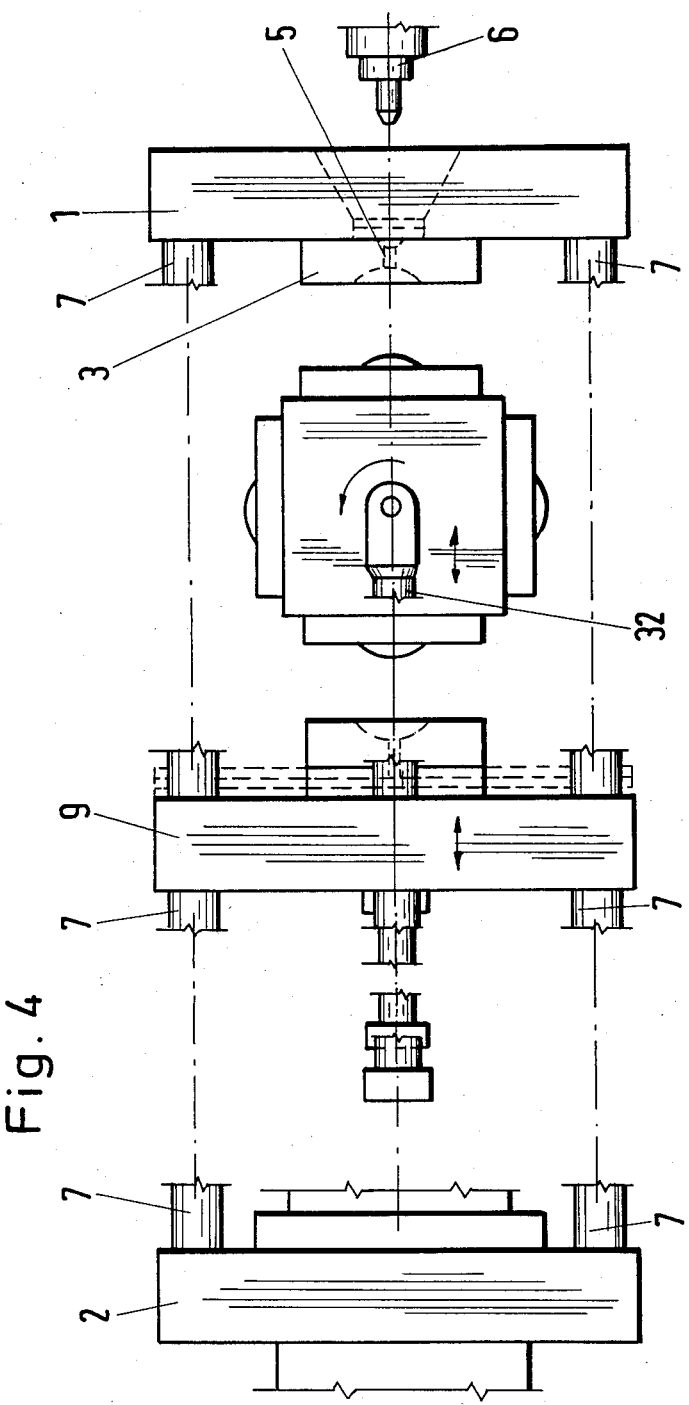
FIG. 4 is a top view of the injection molding machine as shown in FIG. 3.

FIGS. 3 and 4 show a further embodiment of the inventive injection molding machine. The parts thereof which are the same as those of FIGS. 1 and 2 have the same reference numbers. The difference is compared to the first preferred embodiment shown in FIGS. 1 and 2 lies in the fact that the two movable spars, designated 31 and 32, are aligned in a vertical plane and that consequently axis 33 of the support base also extends in a vertical direction.

It is apparent from FIG. 3 that the support base has a prismatic cross section, just as the support base in FIGS. 1 and 2, which corresponds to a regular rectangle, in this case a square.

The prismatic cross section of the support base does not, however, have to be a square or have the outline of a regular N-shape. What is important is that the side surfaces of the support base which face each other and carry half-mold parts are parallel to each other. This is obvious from FIGS. 1 and 4, since the force that keeps the mold shut has to be provided by the closing unit.

Figure 5:
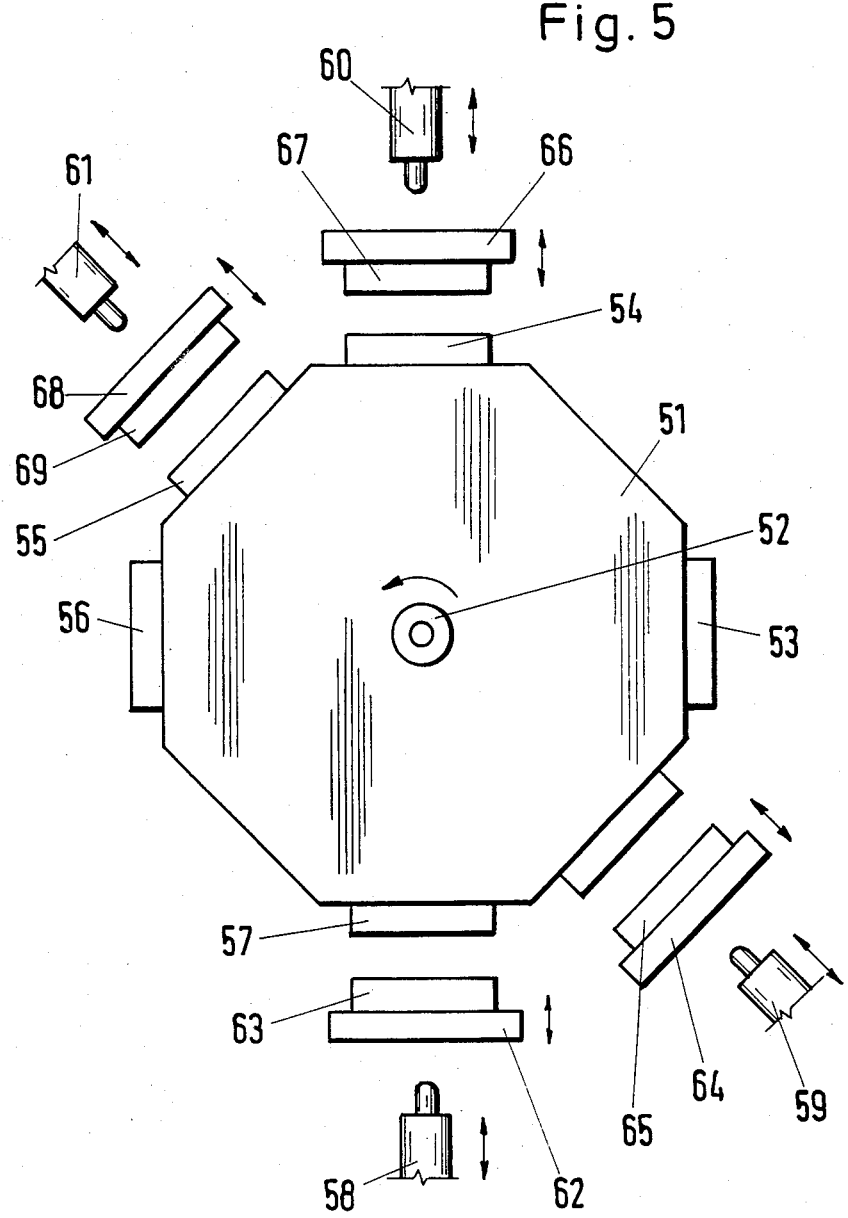
FIG. 5 shows an alternative construction of a support base that can be used in the inventive injection molding machine.

FIG. 5 shows an alternative construction of the support base which can be used in the injection molding machine of FIGS. 3 and 4. The support base 51 has a cross-section transverse to its axis 52 which corresponds to an octagon, whereby the side surfaces which face each other, which extend in the direction of axis 52, are of equal size and always parallel to each other. Support base 51 mounts mold parts 53, 54, 55, 56 and 57.

The position of half-mold parts 53 and 56 corresponds to the mold parts 21 or 23 in FIGS. 3 and 4. In the appropriate injection phase they function, consequently, together with equal form part 3 on fixed die platen 1 or with half-mold part 10 on movable die platen 9 (not shown).

An additional melting and injector unit 58 is provided with an additional die platen 62 with a mounted mold part 63; an additional melting and injector unit 59 with an additional die platen 64 with a mounted mold part 65; an additional melting and injector unit 60 with an additional die platen 66 with a mounted mold part 67, and an additional melting and injector unit 61 with an additional die platen 68 with a mounted mold part 69.

Each additional melting and injector unit is positioned to be movable with its corresponding additional die platen and with the mounted mold part in the direction of the axis of the support base, as shown in the drawing, that is in a transverse direction to the corresponding support surface.

The melting and injector units 58 and 60, together with their additional die platens and their mounted mold parts, can take the place of the melting and injector units 29 and 29' in FIG. 2 or FIG. 4; they can also be used in addition thereto. In the latter case, it is possible to produce injection molded objects which consist off five sections with different material properties.

Because of the fact that the additional melting and injector units 58 and 60, together with their additional die platens and mounted mold parts, are positioned on both sides of the support base to face each other diametrically, axis 52 of the revolute body is subject to reduced strain during the individual injection phases.

Additional melting and injector units 61 and 64 can be provided in the same manner together with their additional die platens and mold parts. In this case it is possible to double the output of the injection molding machine shown in FIGS. 3 and 4 if injection molded objects are produced that contain two areas of sections with different materials.

With the arrangement shown in FIG. 5, it is also possible to produce injection molded objects which have six sections with different materials if the movable die platen works together with an injection aggregate 29 (also compare with FIGS. 3 or 4).

It is also possible in principle to equip the two facing side surfaces with corresponding additional mold parts, which function together with, also provided, additional melting and injector units with corresponding additional die platens and mold parts.

Figure 6:
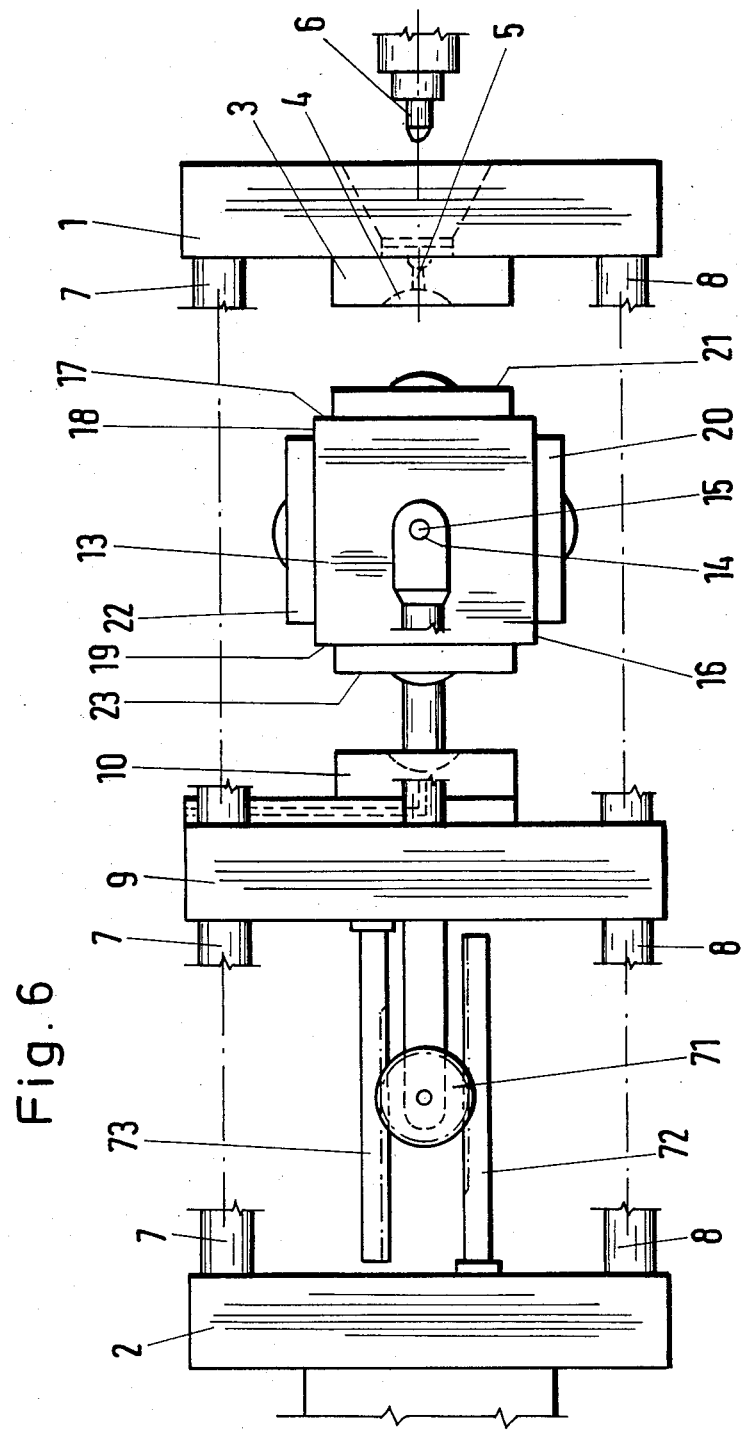
FIG. 6 shows the injection molding machine of FIG. 1 with a preferred means for controlling the position of the support base as a function of the position of the movable die platen therein.

FIG. 6 shows in the molding machine of FIG. 1 with means for controlling the position of the support base as a function of the position of the movable die platen, the same parts being identified by the same numbers. The movable spars on the side of the movable die platen 9 extending away from support base 13 are omitted in FIG. 6 for the sake of clarity. On one of the movable spars for support base 13, a beam 70 is flanged which is guided through an opening of the movable die platen 9. On the end of the beam 70 spaced from the rear face 9b of the movable die plate a pinion 71 is positioned so that it can rotate. It meshes with toothed rods 72 and 73 which are respectively immovably attached to the rear face 9b of the movable die platen 9 and the facing face of the platen 2. As such, the support base always moves only half the distance covered by the movable die platen. When the movable die platen reaches its end position nearest fixed platen 2, the movable support base will be exactly centered between half-mold parts 3 and 10.

There is a particular advantage in the fact that the rotary movement of the core-carrying support base can be initiated as soon as the required opening exists. There is no waiting time. The cycle is shortened and the acceleration force for the support system of the core carrying body is also reduced or applied to the mechanical reproduction of movable die platen 9. The entire opening course of the injection molding machine can therefore be utilized which guarantees optimum utilization of the molding space.

We claim:

1. In an injection molding machine which is used with at least two melting and injector units, said injection molding machine comprising a fixed die platen which mounts a first one-half mold part of an injection mold, fixed spars, a movable die platen which has a rear face facing away from said fixed die platen and a front face facing said fixed die platen, said movable die platen being movable on said fixed spars toward and away from said fixed die platen, said movable die platen including a second one-half mold part of an injection mold on its front face, and a prismatic support base which is rotatably mounted between said fixed die platen and said movable die platen and which is movable toward said fixed die platen, said prismatic support base having an axis which is perpendicular to said fixed spars and having side surfaces which extend in parallel with said axis and which support a set of one-half mold parts of injection molds, each of said one-half mold parts on said prismatic support base being cooperable with said second one-half mold part on said movable die platen to provide an operable injection mold, the improvement wherein said injection molding machine includes movable spars which extend through said movable die platen from first ends spaced away from said rear face of said movable die platen to second ends spaced away from said front face of said movable die platen, said movable spars being movable with said movable die platen; wherein said prismatic support base is rotatably mounted between the second ends of said movable spars; wherein a drive means is connected to said first ends of said movable spars to move said movable spars with respect to said movable die platen; and wherein said movable die platen includes at least one runner which extends from a side surface thereof to the one-half mold part thereon, each said runner being cooperable with a melting and injector unit to enable plasticized material to flow to the one-half mold part thereon.

2. An injection molding machine as defined in claim 1, wherein said prismatic support body has a rectangular cross section; wherein said movable spars are vertically aligned; and wherein when said movable die platen is moved to a molding position nearest said fixed die platen, said second one-half mold part on the front face thereof engages with a one-half mold part on a side surface of said prismatic support base and another one-half mold part on an opposite side surface of said prismatic support base engages with said first one-half mold part of said fixed die platen.

3. An injection molding machine as defined in claim 1, wherein said prismatic support body has a hexagonal cross section; wherein when said movable die platen is moved to a molding position nearest said fixed die platen, said second one-half mold part on the front face thereof engages with a one-half mold part on a side surface of said prismatic support base and another one-half mold part on an opposite side surface of said prismatic support base engages with said first one-half mold part of said fixed die plate; and wherein said injection molding machine includes additional die platens, each additional die platen mounting a one-half mold part of an injection mold for cooperation with the one-half mold parts on the side surfaces of said prismatic support base which are not engaged with said first or second one-half mold parts.

4. An injection molding machine as defrned in claim 1, including a tie bar which connects the first ends of said movable spars; and wherein said drive means comprises a piston-cylinder unit connected to said tie bar.

5. An injection molding machine as defined in claim 1, including another platen positioned away from the rear face of said movable platen, a first toothed rod extending from said rear face of said movable die platen towards said another fixed platen, a second toothed rod extending from said another fixed platen towards said movable die platen, and a pinion gear positioned between and engaging said first and second toothed rods, said pinion gear being movable with said movable spars so that the support base moves half the distance moved by said movable die platen.

* * * * *